United States Patent [19]

Köster et al.

[11] Patent Number: 4,754,413

[45] Date of Patent: Jun. 28, 1988

[54] METHOD FOR OPERATING AN EXTRUDER

[75] Inventors: Lothar Köster; Finn Kroksnes, both of Hamburg, Fed. Rep. of Germany

[73] Assignee: Fried. Krupp Gesellschaft mit beschränkter Haftung, Essen, Fed. Rep. of Germany

[21] Appl. No.: 887,060

[22] Filed: Jul. 18, 1986

[30] Foreign Application Priority Data

Jul. 20, 1985 [DE] Fed. Rep. of Germany ....... 3526050

[51] Int. Cl.⁴ .................... B29C 47/38; B29C 47/92
[52] U.S. Cl. .................................. 364/473; 264/40.1;
264/40.4; 264/40.5; 264/40.7; 264/211.23;
364/557; 364/558; 364/567
[58] Field of Search ................ 264/40.1, 40.4, 40.5,
264/40.7, 211.23; 425/149, 155, 170; 364/473,
497, 498, 499, 500, 557, 558, 567, 568, 569, 571,
575

[56] References Cited

U.S. PATENT DOCUMENTS

| | | | |
|---|---|---|---|
| 3,930,774 | 1/1976 | Brand et al. | 264/40.7 X |
| 4,088,721 | 5/1978 | Apicella, Jr. | 264/40.4 |
| 4,156,913 | 5/1979 | Apicella, Jr. | 264/40.4 X |
| 4,197,070 | 4/1980 | Koschmann | 425/135 |
| 4,233,255 | 11/1980 | Moon | 264/40.4 |
| 4,244,897 | 1/1981 | Moon | 264/40.4 X |
| 4,249,876 | 2/1981 | Strausfeld et al. | 264/40.4 X |
| 4,344,142 | 8/1982 | Diehr, II et al. | 364/473 |
| 4,425,289 | 1/1984 | Lee et al. | 264/40.1 |
| 4,428,896 | 1/1984 | Stevenson | 264/40.1 |
| 4,470,937 | 9/1984 | Sugimoto et al. | 264/40.1 |
| 4,478,775 | 10/1984 | Endo et al. | 264/40.1 X |
| 4,514,812 | 4/1985 | Miller et al. | 364/473 |
| 4,551,289 | 11/1985 | Schwab et al. | 264/40.1 X |
| 4,585,602 | 4/1986 | Capelle | 264/37 |
| 4,671,908 | 6/1987 | Gwinn et al. | 264/40.7 |

FOREIGN PATENT DOCUMENTS

| | | | |
|---|---|---|---|
| 89130 | 9/1983 | European Pat. Off. | 264/40.1 |
| 1554831 | 1/1970 | Fed. Rep. of Germany . | |
| 1454787 | 8/1970 | Fed. Rep. of Germany . | |
| 1579002 | 9/1970 | Fed. Rep. of Germany . | |
| 1554905 | 10/1971 | Fed. Rep. of Germany . | |
| 1554833 | 12/1972 | Fed. Rep. of Germany . | |
| 2335612 | 2/1974 | Fed. Rep. of Germany . | |
| 2119136 | 6/1974 | Fed. Rep. of Germany . | |
| 2723130 | 12/1978 | Fed. Rep. of Germany . | |
| 3013184 | 10/1980 | Fed. Rep. of Germany . | |
| 2920559 | 9/1983 | Fed. Rep. of Germany . | |
| 8227606.4 | 1/1984 | Fed. Rep. of Germany . | |
| 3304865 | 8/1984 | Fed. Rep. of Germany . | |
| 3308138 | 9/1984 | Fed. Rep. of Germany . | |
| 3320203 | 12/1984 | Fed. Rep. of Germany . | |
| 2478524 | 9/1981 | France | 264/40.1 |
| 59-54538 | 3/1984 | Japan | 264/40.1 |
| 967564 | 8/1964 | United Kingdom . | |
| 1031611 | 6/1966 | United Kingdom . | |
| 1315662 | 5/1973 | United Kingdom . | |
| 1376638 | 12/1974 | United Kingdom . | |
| 1446498 | 9/1976 | United Kingdom . | |
| 2022294 | 12/1979 | United Kingdom . | |
| 2141265 | 12/1984 | United Kingdom . | |
| 2166568 | 5/1986 | United Kingdom . | |
| 802062 | 2/1981 | U.S.S.R. | 264/40.1 |
| 929446 | 5/1982 | U.S.S.R. | 264/40.1 |

*Primary Examiner*—Jeffery Thurlow
*Assistant Examiner*—Leo B. Tentoni
*Attorney, Agent, or Firm*—Spencer & Frank

[57] ABSTRACT

In the production of profiles from rubber and/or plastic mixtures, the throughput of the extruder should be kept constant. To this end, an identification of the mixture of material to be processed is fed in the form of a code to a computer system in which the characteristic mixture properties and the set-point operating values for a given profile to be made by the extruder are stored in memory. During the extrusion process, at least one operating variable, preferably the pressure occurring in the mixture of material being processed, is measured continuously, the difference between a measured value at a given time and the corresponding set-point value of the operating variable stored in memory is formed, and this difference is used as a control variable for a governing system for the speed or rpm of the extruder which is operated by the computer system.

20 Claims, 1 Drawing Sheet

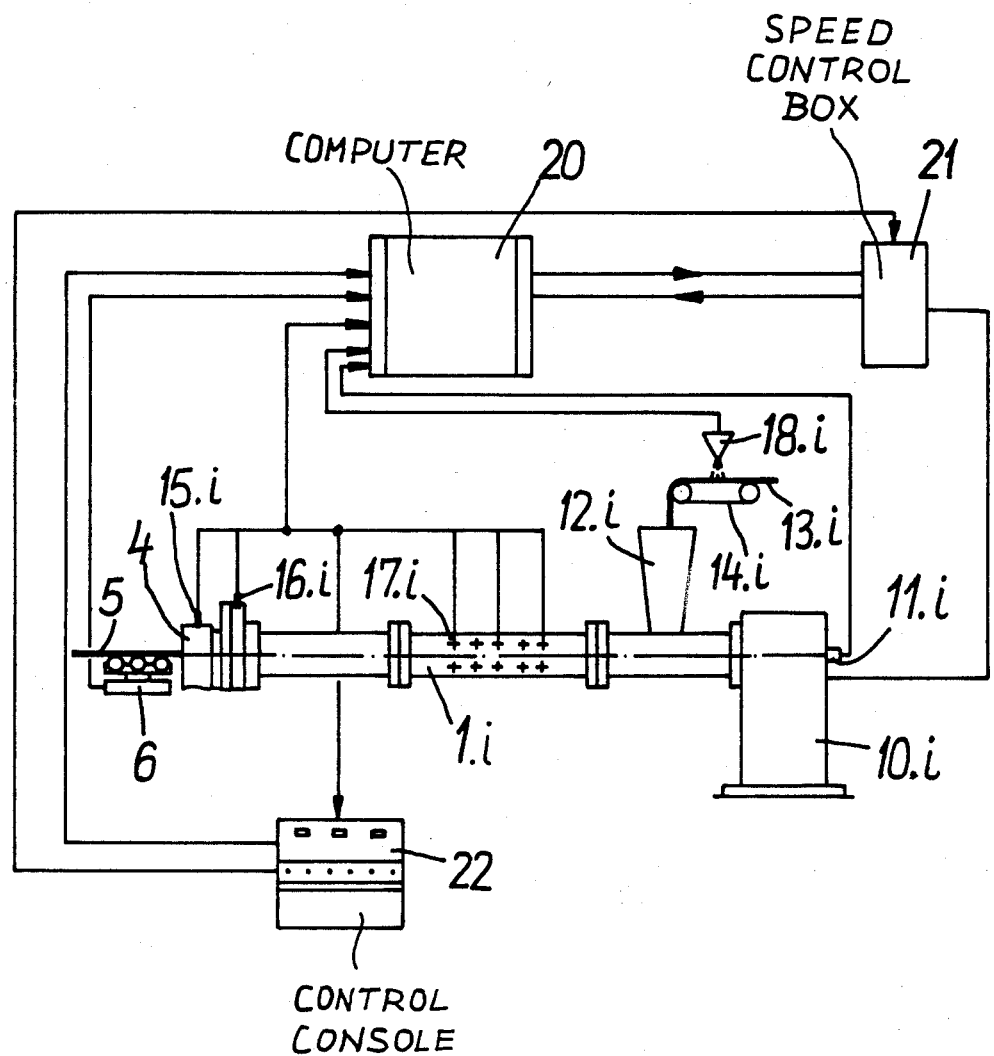

METHOD FOR OPERATING AN EXTRUDER

BACKGROUND OF THE INVENTION

The invention relates to a method of operating an extruder of a single or multiple extruder system for producing profiled sections of rubber and/or plastic mixtures.

Soft-plastic materials, such as rubber mixtures, intended for processing in extrusion systems have different properties in terms of their amenability to processing, which is substantially determined by their Mooney viscosity as defined by DIN 53 523, part 3 (issued November 1976); this will be called merely viscosity hereinafter. The differences in processability of various batches of the same type of material result from discontinuous mixture preparation in the mixing room and from the duration of storage, the storage temperature and variously long molecule chains in the case of natural rubber, among other factors. Furthermore, however, various viscosities can arise even in the rough sheet or web of material in one batch. Fresh mixtures, which have a low viscosity, can be more easily processed, that is, with a lower extruder speed or rpm and with a lower power requirement, than older batches of the same type of mixture due to the increased viscosity of the older batches. In other words, to generate a predetermined mass throughput (measured in kg/s, for example), hereinafter simply throughput, an extruder must be operated at a higher rpm and with a higher power requirement when processing an older mixture than when processing a fresh mixture of the same mixture type. Thus if the extruder rpm remains unchanged, unpredictable variations or fluctuations in the throughput will arise at different viscosities. In a single extruder, such fluctuations in the throughput can result in dimensional discrepancies in the profile. In multiple-extruder systems, fluctuations in the throughput furthermore cause a shift in the content in terms of mass of the individual components of the profile, and thus lead to undesirable loss of quality of the extruded profile.

To compensate for the influence of various processing qualities, or at least to keep such influence at a minimum, it has already been proposed (see e.g., Federal Republic of Germany Patent Application DE-OS No. 33 20 203, published Dec. 12th, 1984) that the extruder, or each extruder, be fed with a plurality of rough sheets or webs of material from different batches of the same type of material mixture so as to attain a homogenizing effect.

This known method has the disadvantage, however, that a large amount of space is required for furnishing pallets for holding the various batches. Furthermore, all that is attainable by this method is a homogeneity in the material properties by means of statistical mixing. Spontaneously occurring deviations in the statistical mean value cannot be precluded in this known method.

SUMMARY OF THE INVENTION

It is the object of the invention to provide a method for operating an extruder with which the throughput of the extruder, is steady operation, can be kept largely constant, or regulated to be largely constant, even if the Mooney viscosity of the material mixture to be processed varies over time.

The above object is achieved according to the present invention by a method for operating an extruder of an extruder system for producing profiled sections of rubber and/or plastic mixtures, comprising the steps of: determining the characteristic properties of various mixtures of material to be extruded and the corresponding set-point (desired) operating values for the process variables of the extruder for the particular profile to be extruded; storing the charcteristic mixture properties and the set-point operating values for the particular profile in a memory of a computer system based on electronic data processing; feeding a mixture of material to be processed to the extruder; identifying the mixture of material being fed to the extruder and feeding an identifying code to the computer system; during the extrusion process, continuously measuring at least one operating variable of the extrusion process; forming the difference between the measured value of an operating variable at a given time and the corresponding set-point value stored in memory for the mixture being fed in; and using any said difference as a control variable, in a governing system operated by the computer system, to control the speed of the extruder.

It has unexpectedly been found that the constancy of the throughput of the extruder can be attained, even when unforeseeable fluctuations in the Mooney viscosity occur over time, by means of a simple linear regulation of the rpm of the extruder as a function of the measured value at a given time of some method parameter or operating variable. In the case of repeated production of a particular profile from one and the same type of material mixture, this can be done as a function of predetermined constant values stored in memory (nominal or set-point rpm, set-point for the operating variable). This also provides constancy in terms of the proportion by mass of the individual components of the profile in the case of multiple-extruder systems. The constancy attainable is essential, among other considerations, for an ensuring production-line regulation, by means of which dimensional discrepancies in the overall profile, for instance, because of variable swelling form moisture absorption, can be compensated for by means of a change in line speed.

According to a feature of the invention, the speed or rpm of the extruder is raised relative to the set-point speed (rpm) whenever the measured value of the operating variable is above the corresponding set-point value. Conversely, the speed (rpm) of the extruder is reduced if the measured value is below the corresponding set-point value.

Relatively accurate regulation is attained if the speed (rpm) of the extruder is governed such that the amount of variation in the speed (rpm) corresponds to the product of the three following factors: (1) a proportionality factor (k) which can be determined by experimentation for the extruder and for the type of material mixture to be processed in it; (2) the set-point speed or rpm ($n_0$); and (3) the difference with respect to the set-point value of the operating value formed from the measured value at a given time divided by the corresponding set-point value. The proportionality constant can also be called up, as a value stored in memory in the computer system, via the code for the material mixture and for the profile.

According to a further feature of the invention, the regulating or governing process is effected or carried out at intervals of two to thirty seconds and preferably at intervals of five to ten seconds. This time interval enables recognition of any fluctuations that may occur in the processability of the material mixture sufficiently early so as to provide compensation for the fluctuations.

According to still a further feature of the invention the proportionality factor k is determined by: operating the extruder with various batches of the type of material mixture to be processed, with the various batches having Mooney viscosities (M', M'') above and/or below the desired or set-point Mooney viscosity (M); adjusting the extruder speed to provide the set-point throughput ($q_0$) for the extruder with the various batches of different Mooney viscosity; measuring the operating variables at this adjusted speed; and deriving the proportionality factor from the quotient of the ratio of the difference between this adjusted speed and the set-point speed to the set-point speed, divided by the ratio of the difference between the measured value of at least one operating variable at this adjusted speed and the corresponding set-point value to this corresponding set-point value for the operating variable. In this manner, the proportionality factor which should be associated with each method parameter or operating variable can be determined for every profile that is to be made from a predetermined mixture of material at a set-point or desired operating point. By appropriate conversion of the quotient, the following relationship can also be used for ascertaining the proportionality factor:

$$k = \frac{\frac{\text{measured rpm}}{\text{set-point rpm}} - 1}{\frac{\text{measured value of operating variable}}{\text{set-point value of operating variable}} - 1}$$

If different values should be obtained when determining the proportionality factor for a mixture having a higher Mooney viscosity then for a mixture having a lower Mooney viscosity but with the same type of material, then the different values ascertained can easily be averaged to obtain the proportionality factor to be used.

According to a preferred feature of the invention, the constancy of the throughput can advantageously be attained if the pressure exerted upon the given mixture of material at a location remote from the given delivery location is used as the method control parameter or operating variable. However, the pressure is in no way the only operating variable that can be used for this purpose. For instance, it is equally possible to use the temperature occurring in the material mixture, or the electric current drawn by the extruder motor, or a plurality of these operating variables, for regulation in a corresponding manner.

The subject of the invention will be described in greater detail below, in terms of a exemplary embodiment shown in the drawing.

BRIEF DESCRIPTION OF THE DRAWING

The single FIGURE of the drawing is a schematic illustration showing one extruder of a multiple-extruder system, with the associated control and regulating devices.

DETAILED DESCRIPTION OF THE PREFERRED EMBODIMENT

Referring now to the FIGURE, there is schmatically shown an extruder system for carrying out the invention which includes a plurality of extruders 1.$i$ (where i=1, 2, ... and represents a particular one of the extruders) which substantially all have the same design and may differ only in their dimensions. For the sake of simplicity, only one of the extruders 1.$i$, is shown in the drawing.

The extruders 1.$i$ are each secured with their ends on the outlet side to an extrusion head 4 that is common to all of the extruders. On their end remote from the extrusion head 4, each of the extruders 1.$i$ is equipped with its own drive 10.$i$ (where again i=1, 2, ... ), which has a governable rpm or speed and has an integrated rpm transducer 11.$i$. In the vicinity of its drive 10$i$, each extruder 1.$i$ also has a respective hopper 12.$i$ for the feeding in of a self-elastic mixture of material in sheet form, each sheet coming from a respective feeding strip 13.$i$. The plurality of sheets fed to the respective hoppers 12.$i$ are processed together in the plurality of extruders to make a multiple-part profiled band or strip 5. The feeding strips 13.$i$ are fed to the respective hoppers 12.$i$ by means of respective feeder belts. 14.$i$.

Each extruder 1.$i$ is provided with one temperature sensor 15.$i$ and one pressure sensor 16.$i$ which are disposed, separately for each extruder, on the common extrusion head 4. If desired, additional pressure sensors 17.$i$ may be distributed uniformly over the length of the individual extruders. A respective material-composition reader 18.$i$ is also associated with each extruder 1.$i$.

Following the profile outlet (not shown per se) of the extrusion head 4, there is a weighing instrument or scale 6 for measuring the weight per meter of the profiled band or strip 5. The output of the scale 6 and the outputs of the material-composition readers 18.$i$, the temperature sensors 15.$i$, the pressure sensors 16.$i$ and the rpm or speed transducers 11.$i$ are connected to the input of a computer system 20 having an integrated data bank. The output of the computer system 20 is connected via a control box 21 with the respective drives 10.$i$ of the individual extruders 1.$i$. Furthermore, the input of the computer system 20 and of the control box 21 are each connected to a control console or terminal 22.

For every desired type of profiled strip to be extruded, a desired or set-point operating point is determined, with a corresponding desired or set-point total throughput $q_{0tot}$ (which is the sum of the throughputs $q_{0i}$, where i=1, 2, ... ), corresponding set-point rpm values $n_{0i}$, set point pressures $p_{0i}$ and a range of operating temperatures $\theta_i$, where the feeding strips 13.$i$ used are from mixtures of materials with a Mooney viscosity M that is as homogeneous as possible. To this end, the speed or rpm of an individual extruders 1.$i$ is varied by hand until such time as the profiled strip 5 has the desired or required quality. That is, the speed is varied until the content or proportion by mass $m_i$ (where i=1, 2, ... ), or the corresponding length-related mass proportion $m_i'$ of the individual ingredients or components, comprising the mixtures 13.$i$, of the profiled strip correspond to the values required. The individual length-related mass proportions $m_i'$ in %, vary from one to another and with respect to the length-related total mass $m_{tot}'$ of the total profile strip 5 in the same manner as the corresponding mass throughputs $q_i$ vary with respect to one another or to the total throughput $q_{tot}$.

The set-point throughputs $q_{0i}$, rpm values $n_{0i}$, pressures $p_{0i}$ and temperatures $\theta_i$ (where i=1, 2, ... ) obtained for the production of a particular profile or profiled strip 5 are stored in memory in the data bank of the computer system 20.

Since the pressures $p_i$ occurring in the extrusion head 4 are subject to severe fluctuations over time, the signals from the respective pressure sensor 16.$i$ are fed to the computer system 20 via respective low-pass filters (not shown separately). Thus it is not the instantaneous pressure values, which fluctuate over time, that are detected, but only the given pressure levels. Accordingly, it is to be understood that the term "pressure" or any of its variations, e.g. "set-point pressure", as used in this application means the "pressure level" or correspondingly the "set-point pressure level".

Before commencement of the actual continuous operation and control of the extruder system according to the method of the invention, for each type of profiled strip 5, each individual extruder 1.$i$ is fed successively with a strip 13.$i$ of material from the same mixture type, but with somewhat different Mooney viscosities M'=M+ΔM and/or M"=M−ΔM. The other extruders may be stopped at that time. In feeding the material having the Mooney viscosity M' or M", the rpm $n_i$ of the associated extruder 1.$i$ is varied by being raised to an rpm n' when the Mooney viscosity M'>M and by being lowered to an rpm $n_i$" when the Mooney viscosity M"<M, until such times as the partial throughput $q_i$ of the associated extruder 1.$i$ corresponds to its desired or set-point throughput $q_{0i}$. The throughput can be determined in a simple manner in that the mass m of a partial length of the profiled strip extruded within a period of time Δt is weighed and the quotient $$q_i = m/\Delta t \tag{1}$$

is obtained.

The speed or rpm values $n_i'$ or $n_i"$ required to produce the partial throughput $q_i = q_{0i}$ ascertained as above, and the corresponding pressures $p_i'$ or $p_i"$ are stored in the data bank of the computer system 20. From these values, a proportionality factor $k_i$ can be determined, separately for each extruder, which is obtained according to the following formula (2), and/or according to the following equivalent formulas (3) or (4):

$$k_i = (\Delta n_i/n_{0i}) \div (\Delta p_i/p_{0i}) \tag{2}$$

$$k_i = (n_i'/n_{0i} - 1) \div (p_i'/p_{0i} - 1) \tag{3}$$

$$k_i = (1 - n_i"/n_{0i}) \div (1 - p_i"/p_{0i}) \tag{4}$$

The proportionality factors $k_i$ (i=1, 2, ...) determined in this way are applicable for a particular type of profiled strip 5 and a particular extruder 1.$i$ and are stored in the memory bank of the computer system 20.

In a modification of the above-described method for determining the proportionality factor $k_i$, a constant set-point rpm $n_{0i}$ can also be used, in which case different throughputs $q_i'$, $q_i"$ then result when the Mooney viscosities M', M" vary. The proportionality factor $k_i$ in this case becomes:

$$k_i = p_{0i}(q_{0i}/q_i' - 1) \div (p_i' - p_{0i}) \tag{5}$$

or $$k_i = p_{0i}(q_{0i}/q_i" - 1) \div (p_i" - p_{0i}) \tag{6}$$

To produce a profiled strip 5 with the method according to the invention, first the temperatures $\theta_i$ at the respective extruders 1.$i$ and at the extrusion head 4 are brought to the intended operating temperatures, and all of the extruders 1.$i$, including the extrusion head 4, are filled with the intended mixtures of material from the respective feeding strips 13.$i$.

Once the system has been run up to this desired operating point with the corresponding set-point values ($q_{0i}$, $n_{0i}$, $p_{0i}$) stored in the computer 20, and optionally with a short settling phase, the extrusion system is operated in continuous operation as regulated by the computer system 20. At time intervals of from 2 to 30 seconds, and preferably from 5 to 10 seconds, the signals for the pressures $p_i$, temperatures $\theta_i$, rpm values $n_i$ and total throughput $q_{tot}$, among others, derived respectively from the pressures sensors 16.$i$ and/or 17.$i$, the temperatures sensors 15.$i$, the rpm transducers 11.$i$ and the weight-per-meter scale 6, are fed into the computer system 20. In the computer 20, at least one of the measured operating variables is compared with its corresponding desired or set-point value to determine a control variable to be fed to the control box 21. According to the preferred embodiment of the invention, the process operating variable utilized is the operating pressure. Therefore, in the computer 20, the operating pressures $p_i$ detected by the pressure sensors 16.$i$ are compared, in the above mentioned succession of time intervals, with the corresponding set-point pressures $p_{0i}$ stored in memory. In the case of a pressure deviation ($p_i - p_{0i}$) dictated by a change in viscosity, the speed or rpm $n_i$ of the respective extruder 1.$i$ at which a corresponding deviation is ascertained is varied by the amount $$\Delta n_i = n_{0i} \cdot k_i \cdot (p_i - p_{0i})/p_{0i} \tag{7}$$

or $$\Delta n_i = n_{0i} \cdot k_i \cdot (p_i/p_{0i} - 1) \tag{8}$$

The proportionality factor $k_i$ determined in the above-described manner is activated in the computer system 20 via the respective material-composition reader 18.$i$, either automatically or by manual action at the control console or terminal 22.

If the measured operating pressure $p_i$ is above the corresponding set-point pressure $p_{0i}$, then $\Delta n_i$ has a positive value, in which case the computer 20 causes the rpm $n_i$ of the extruder 1.$i$ to be raised by $\Delta n_i$ above the set-point rpm $n_{0i}$. Alternatively, if the measured operating pressure $p_i$ is below the set-point pressure $p_{0i}$, then $\Delta n_i$ assumes a negative value and computer 20 causes the speed or rpm $n_i$ to be correspondingly lowered with respect to the set-point speed $n_{0i}$. Pressure fluctuations that arise are thus responded to with rpm changes in the same direction.

The regulation described for keeping the throughputs $q_i$ of the individual extruders 1.$i$ constant, and hence for keeping the total throughput $q_{tot}$ constant, can be performed until such time as the temperature $\theta_i$ measured by one of the temperature sensors 15.$i$ reaches a maximum authorized value $\theta_{max}$, because any further increase in the speed would cause this temperature $\theta_{max}$ to be exceeded.

It will be understood that the above description of the present invention is susceptible to various modifications, changes and adaptations, and the same are intended to be comprehended within the meaning and range of equivalents of the appended claims.

What is claimed is:

1. In a method for operating an extruder of an extruding system for producing profiled sections made from rubber and/or soft plastic mixtures with, relative to the extruder, a set-point Mooney viscosity (M) at a set-point operating point of the extruder with a corresponding set-point throughput value ($q_o$), a corresponding set-point extruder speed ($n_o$), and a set-point value for at least one operating variable measured at or in front of the extruder head, said method including measuring the value of at least one operating variable, and changing the speed of the extruder in the event of a deviation of the respective measured said at least one operating variable from the corresponding set-point value at predetermined time intervals; the improvement wherein said step of changing includes changing said extruder speed (n) in proportion to a proportionality factor (k) which is valid for the extruder and for the type of material mixtures to be processed in it and which has been previously determined by experimentation; and wherein said proportionality factor (k) is previously determined by:

operating the extruder with various batches of the same type of material mixture to be processed, with the various batches having differing Mooney viscosities (M', M'') above and/or below said set-point Mooney viscosity (M) and with the exruder speed being adjusted to a value (n') to provide said set-point throughput value ($q_o$) for the extruder with the respective various batches of different Mooney viscosity (M', M'');

measuring said at least one operating variable at the adjusted speed (n'); and deriving said proportionality factor (k) from the quotient of the ratio of the difference between said adjusted speed (n') and said set-point speed ($n_o$) to said set-point speed ($n_o$), divided by the ratio of the difference between said measured value of said at least one operating variable at said adjusted speed (n') and the corresponding set-point value to said corresponding set-point value for the operating variable.

2. A method as defined in claim 1 wherein said predetermined time intervals are of from 2 to 30 seconds.

3. A method as defined in claim 2 wherein said predetermined time intervals are from 5 to 10 seconds.

4. A method as define in claim 1, wherein said step of varying the speed includes changing the speed by an amount corresponding to the product of the three following factors;

said stored proportionality factor determined by experimentation for the particular extruder and for the type of material mixture to be processed in it;

the set-point speed ($n_0$); and the difference formed between said measured value of an operating variable at a given time and the corresponding set-point value, divided by said corresponding set-point value.

5. A method as defined in claim 4 wherein said predetermined time intervals are of from 2 to 30 seconds.

6. A method as defined in claim 5 wherein said predetermined time intervals are from 5 to 10 seconds.

7. A method as defined in claim 1, wherein: said at least one operating variable which is measured for the respective Mooney viscosities (M', M'') is the pressure (p) exerted upon the applicable material mixture; and said proportionality factor (k) is equal to $(n'/n_o - 1)/(p/p_o - 1)$, wherein $p_o$ is the set-point pressure value for the extrusion process.

8. A method as defined in claim 1 wherein said extruder system is a multiple extruder system having a plurality of extruders connected to a common extruder head; and wherein said steps of method are carried out separately for each extruder of the system.

9. A method as defined in claim 1 wherein: said at least one operating variable which is measured for the respective Mooney viscosity (M', M'') is the temperature ($\theta$) of the material mixture; and wherein said proportionality factor (k) is equal to $(n/n_o - 1)/(\theta/\theta_o - 1)$, where $\theta_0$ is the set-point temperature value for the extrusion process.

10. A method as defined in claim 9 further comprising: identifying the material mixture to be processed before it is fed into the extruder; and feeding an identifying code to a computer system based on electronic data processing in which the set-point throughput ($q_o$), the set-point speed ($n_o$), the set-point pressure ($p_o$), the set-point temperature ($\theta_o$) and the proportionality factor (k) for the repsective material mixture are stored.

11. A method as defined in claim 7 further comprising: identifying the material mixture to be process before it is fed into the extruder; and feeding an identifying code to a computer system based on electronic data processing in which the set-point throughput ($q_o$), the set-point speed ($n_o$), the set-point pressure ($p_o$), the set-point temperature ($\theta_o$) and the proportionality factor (k) for the respective material mixture are stored.

12. A method as defined in claim 11, wherein said step of identifying the material mixture to be processed is effected by means of a material-composition reader.

13. In a method for operating an extruder of an extruding system for producing profiled sections made from rubber and/or soft plastic mixtures with, relative to the extruder, a set-point Mooney viscosity (M) at a set-point operating point of the extruder with a corresponding set-point point throughput value ($q_o$), a corresponding set-point extruder speed ($n_o$), and a set-point value for at least one operating variable measured at or in front of the extruder head, said method including measuring the value of at least one operating variable, and changing the speed of the extruder in the event of a deviation of the respective measured said at least one operating variable from the corresponding set-point value at predetermined time intervals; the improvement wherein said step of changing includes changing said extruder speed (n) in proportion to a proportionality factor (k) which is valid for the extruder and for the type of material mixture to be processed in it and which has been previously determined by experimentation; and wherein said proportionality factor (k) is previously determined by:

operating the extruder with various batches of the same type of material mixture to be processed, with the various batches having differing Mooney viscosities (M', M'') above and/or below said set-point Mooney viscosity (M) and with the extruder speed being adjusted to said set-point speed ($n_o$) for the extruder with the respective various batches of different Mooney viscosity (M', M'');

measuring said at least one operating variable and the throughput (q) of the extruder at the set-point speed ($n_o$); and deriving said proportionality factor (k) from the product of (1) the set-point value of said at least one operating variable and (2) the quotient of the ratio of the different between said set-point throughput value ($q_o$) and said measured throughput value (q) to said measured throughput value (q), divided by the difference between said measured value of said at least one operating variable at said set-point speed ($n_o$) and the corresponding set-point value for the operating variable.

14. A method as defined in claim 13, wherein: said at least one operating variable which is measured for the respective Mooney viscosity (M', M'') is the pressure (p) exerted upon the applicable material mixture; and the proportionality factor (k) is equal to $$p_o\left(\frac{q_o}{q} - 1\right)/(p - p_o),$$

where $p_o$ is the set-point pressure for the extrusion process.

15. A method as defined in claim 13: wherein said at least operating variable which is measured for the respective Mooney viscosities (M', M'') is the temperature ($\theta$) of the material mixture; and wherein said proportionality factor (k) is equal to $$\theta_o\left(\frac{q_o}{q} - 1\right)/(\theta - \theta_o),$$

where $\theta_o$ is the set-point temperature for the extrusion process.

16. A method as defined in claim 13 further comprising: identifying the material mixture to be processed before it is fed into the extruder and feeding an identifying code to a computer system based on electronic data processing in which the set-point throughput ($q_o$), the set-point speed ($n_o$), the set-point pressure ($p_o$), the set-point temperature ($\theta_o$) and the proportionality factor (k) for the respective material mixture are stored.

17. A method as defined in claim 15 further comprising: identifying the material mixture to be processed before it is fed into the extruder and feeding an identifying code to a computer system based on electronic data processing in which set-point throughput ($q_o$), the set-point speed ($n_o$), the set-point pressure ($p_o$), the set-point temperature ($\theta_o$) and the proprotionality factor (k) for the respective material mixture are stored.

18. A method as defined in claim 16, wherein said step of the identifying the material mixture to be processed is effected by means of a material-composition reader.

19. A method as defined in claim 18 wherein said predetermined time intervals are of from 2 to 30 seconds.

20. A method as defined in claim 19 wherein said predetermined time intervals are from 5 to 10 seconds.

* * * * *